Aug. 27, 1968    J. MAY    3,398,771
PORTABLE DIMENSIONAL CUTTING SAW APPARATUS
Filed March 28, 1966    6 Sheets-Sheet 1
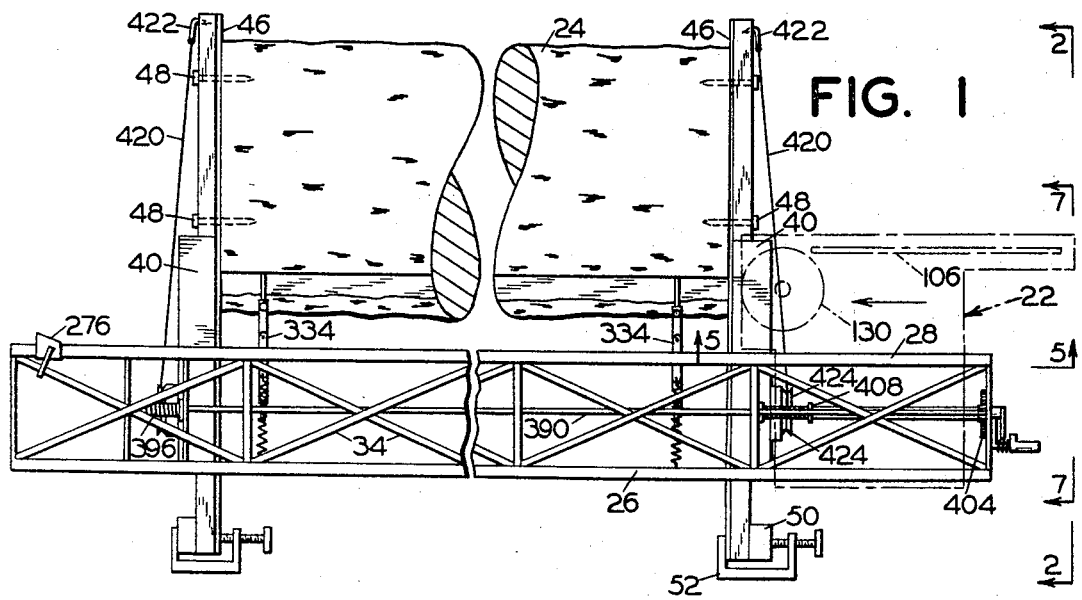
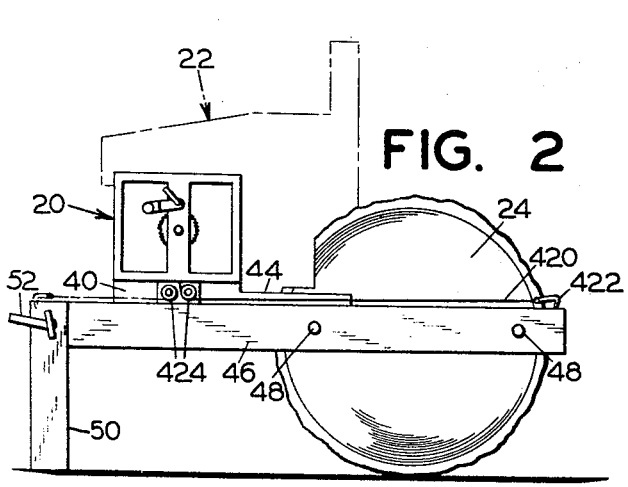
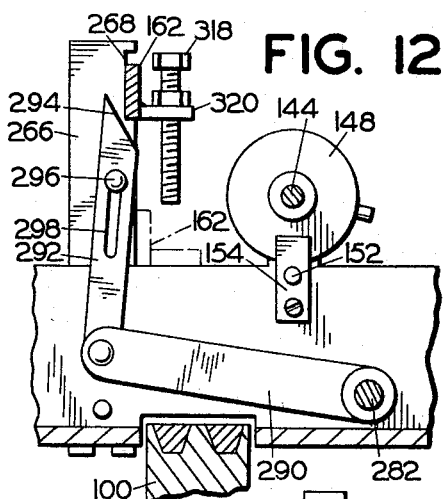
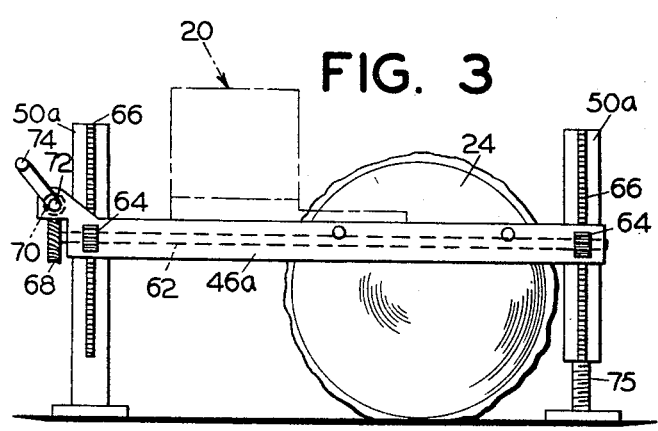
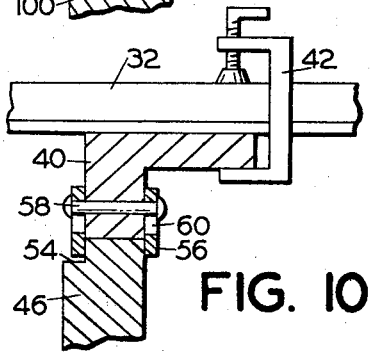
INVENTOR.
JIM MAY
BY Eugene M. Eckelman
ATTORNEY Aug. 27, 1968  J. MAY  3,398,771
PORTABLE DIMENSIONAL CUTTING SAW APPARATUS
Filed March 28, 1966  6 Sheets-Sheet 2
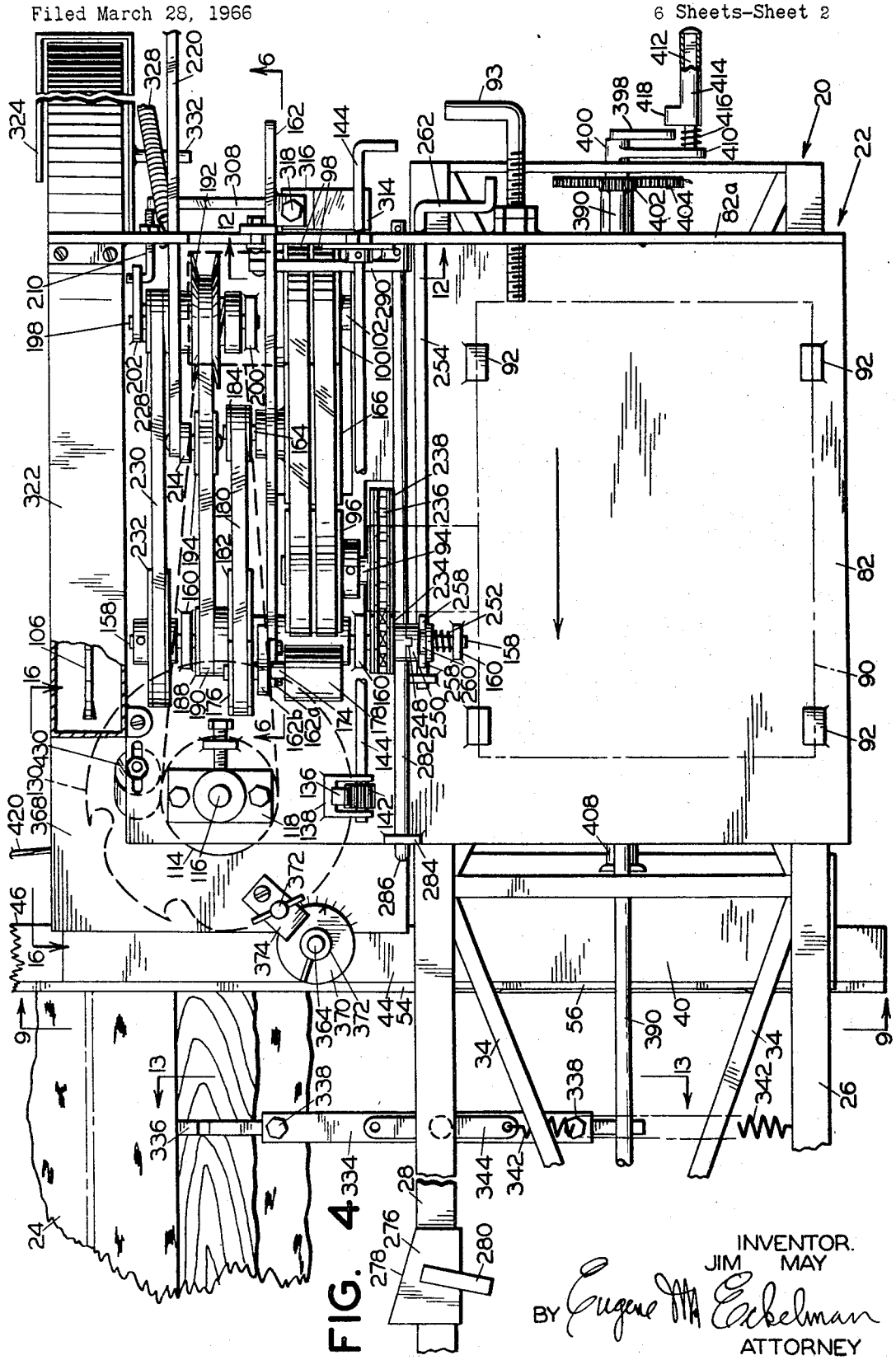
INVENTOR.
JIM MAY
BY Eugene M. Eckelman
ATTORNEY Aug. 27, 1968  J. MAY  3,398,771
PORTABLE DIMENSIONAL CUTTING SAW APPARATUS
Filed March 28, 1966  6 Sheets-Sheet 3
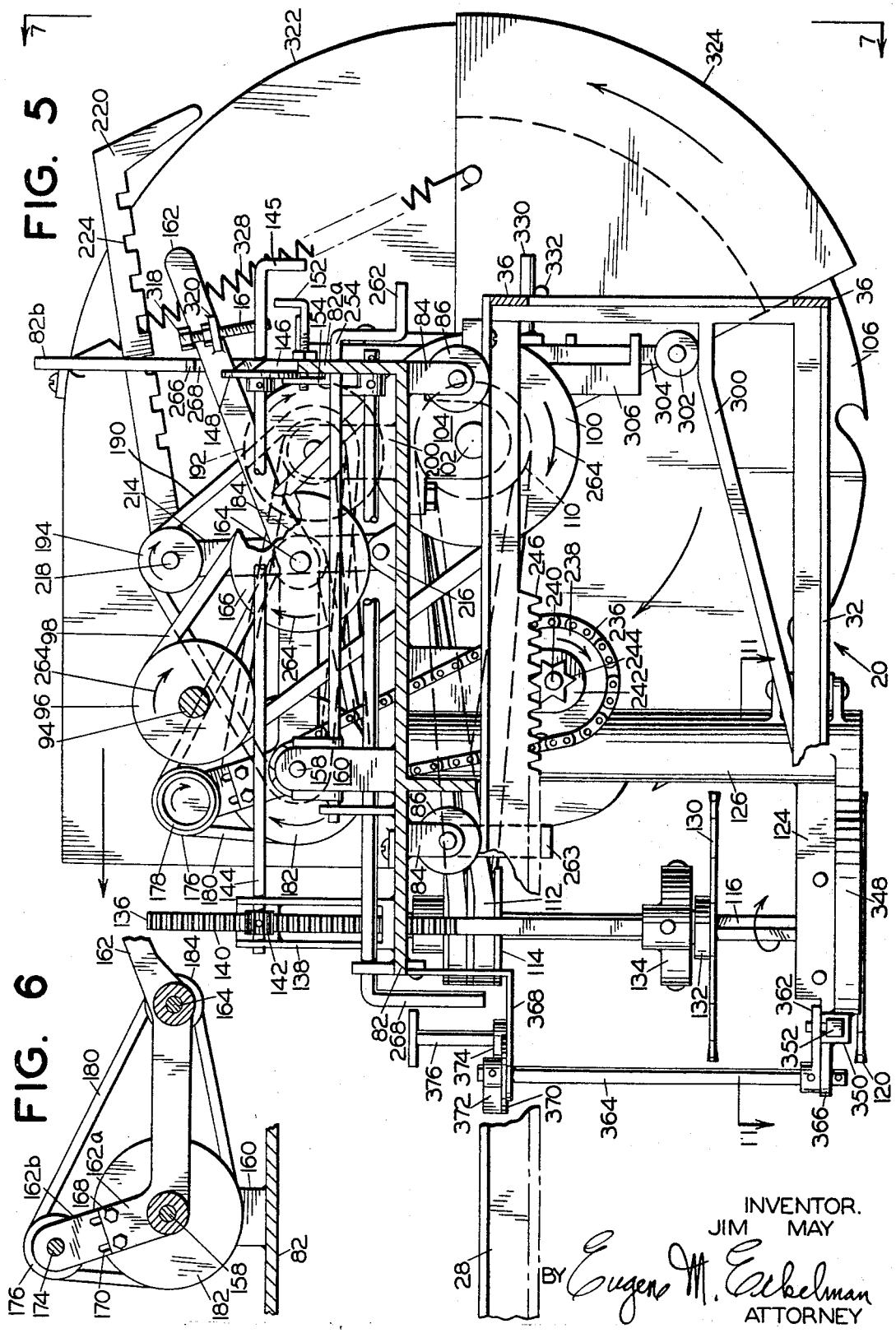
INVENTOR.
JIM MAY
BY Eugene M. Eckelman
ATTORNEY

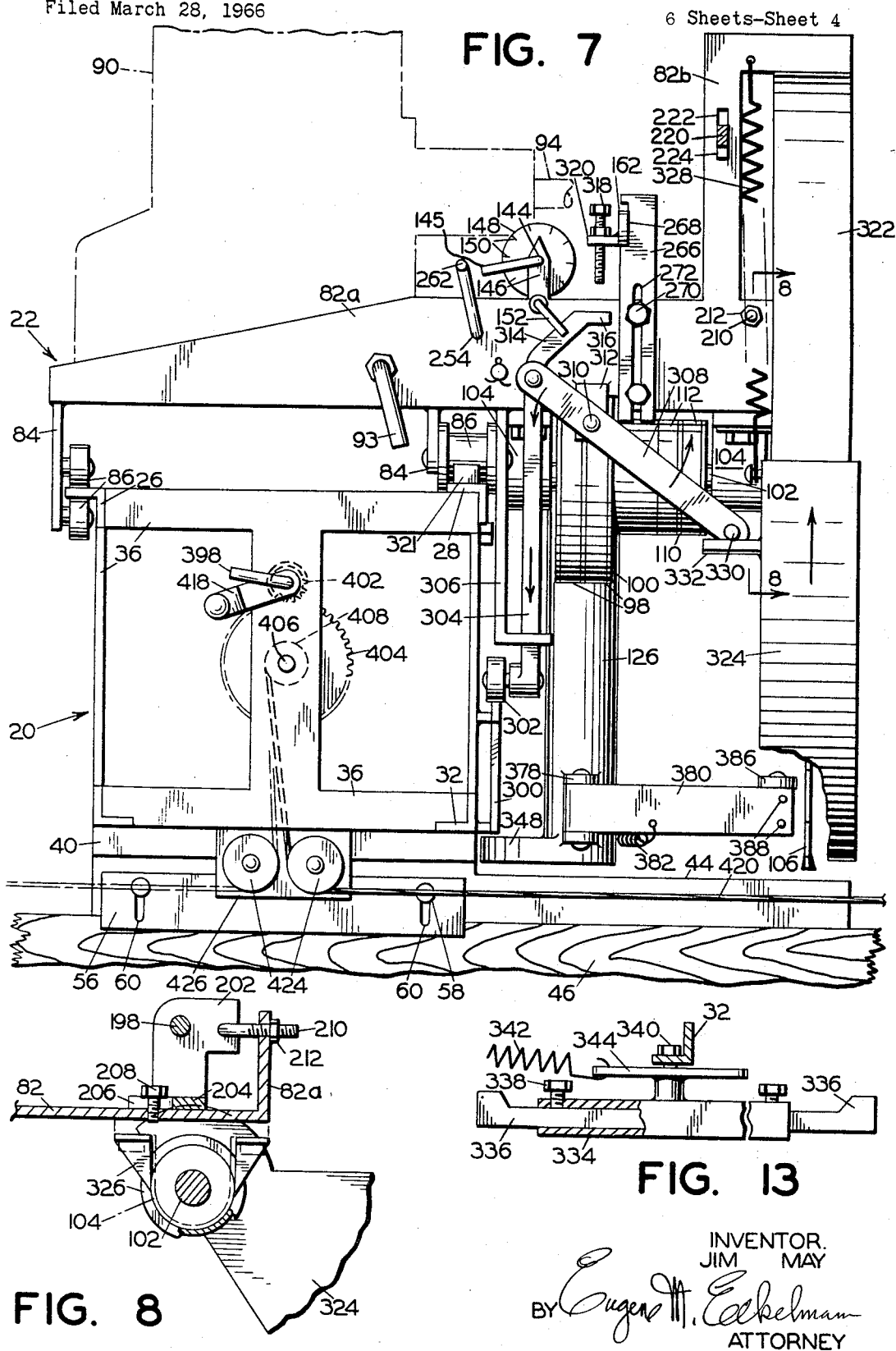

Aug. 27, 1968    J. MAY    3,398,771
PORTABLE DIMENSIONAL CUTTING SAW APPARATUS
Filed March 28, 1966    6 Sheets-Sheet 6
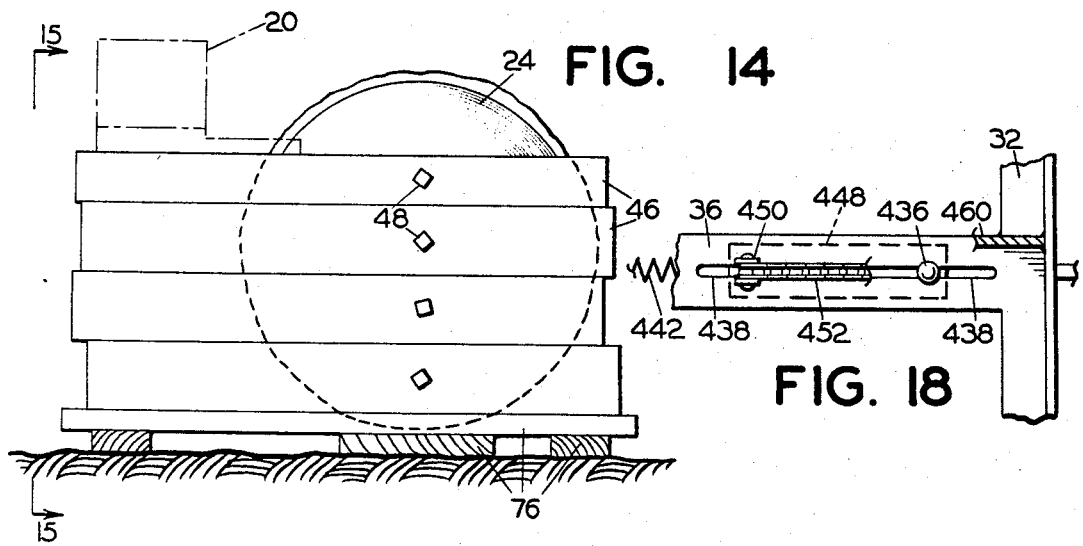
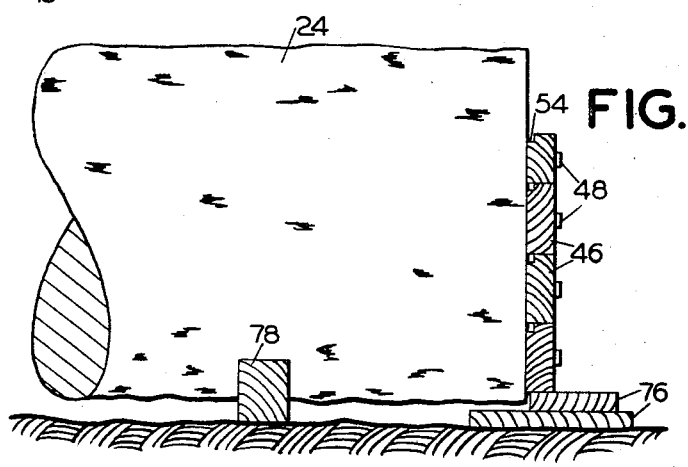
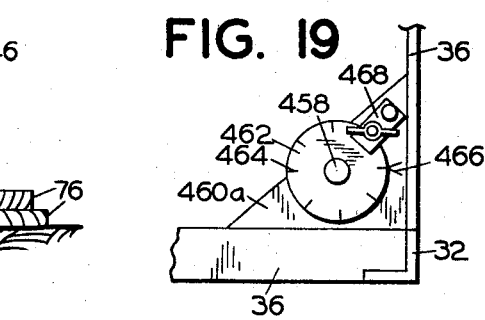
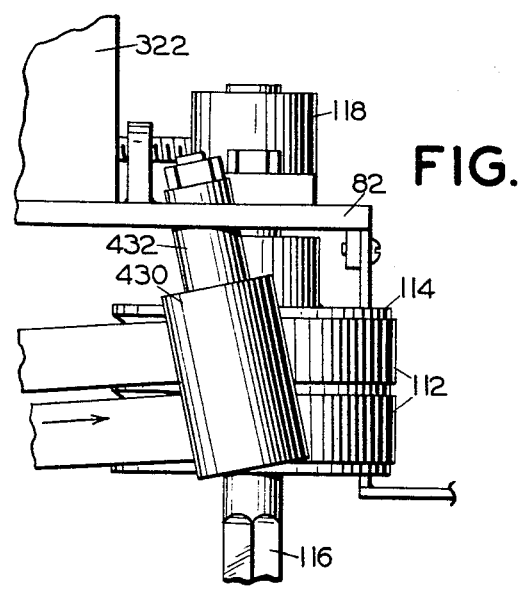
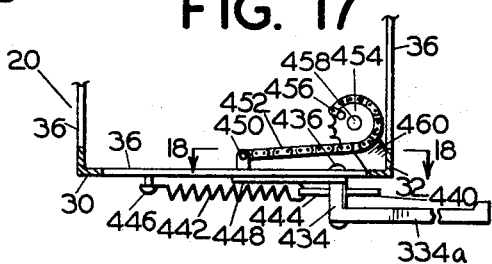
INVENTOR.
JIM MAY
BY Eugene M. Eckelman
ATTORNEY

# United States Patent Office 3,398,771
Patented Aug. 27, 1968

3,398,771
PORTABLE DIMENSIONAL CUTTING SAW APPARATUS
Jim May, 12110 SE. Pine, Portland, Oreg. 97216
Filed Mar. 28, 1966, Ser. No. 537,835
16 Claims. (Cl. 143—38)

This invention relates generally to saw apparatus, and more particularly to saw apparatus employable to cut boards of pre-determined dimension from a log, the apparatus, therefore, being referred to herein as dimensional cutting saw apparatus.

The apparatus of the invention features a construction whereby it is portable from one site to another. Thus, the apparatus is particularly useful in cutting lumber from logs at the site where they have been felled.

One method of harvesting trees and producing lumber comprises felling the trees, and then transporting the felled trees as logs to a mill where the logs are cut into lumber. While such a practice is feasible in some instances, this is not always the case. For instance, forest regulations sometimes prevent the conversion of logs into lumber in this fashion, by barring from a forest the usual logging equipment. Even in those instances where the log-handling equipment and log carriers are permitted in the forest, it is required that access roads be built, at a cost which renders harvesting of the trees uneconomical. There is the additional factor that in certain areas, tracts of timber may be of such small size, or be scattered over such isolated areas, or located in such difficult terrain, as to make removal of logs for transport to a mill a complicated and costly problem. These and other considerations have indicated the desirability of portable means for cutting lumber which may be transported directly to the site of a log where it falls on the ground. By cutting lumber from such a log and then moving the cut lumber, frequently transportation costs may be lowered, the need for extensive access roads is eliminated, and areas can be cleared of usable wood which by regulation cannot be handled using ordinary lumbering techniques.

Generally, an object of the invention is to provide improved portable saw apparatus, for producing dimensionally cut boards from a fallen log at the site where it has been felled.

Another general object is to provide apparatus of this description which may be moved from one place to another, set up, and operated, with a minimum number of men. The apparatus requires little supervision, and in many instances can be easily operated by one person.

It is not uncommon for a log, particularly if it has been cut from older timber, or if it has lain on the ground for some time, to be imperfect over certain regions therein. In cutting boards from such a log, it is desirable to cut the log in such a manner that imperfect portions may be separated out, with a minimum amount of good wood with these imperfect portions, and to leave the remainder of the log in such a state that sound boards of maximum length may be cut therefrom. The apparatus of this invention features a novel organization of saws, and means for making certain adjustments therein, whereby these ends and thus optimum utilization of good wood may be realized.

In cutting lumber from a log, obtaining proper dimensions in the boards produced is important. Portable saw-cutting apparatus proposed heretofore has been subject to a number of disadvantages, including in many instances the inability to make accurate cuts. A principal reason for this deficiency has been the presence of sawdust, which has introduced variances in the paths that the saw or saws in the apparatus take during a cutting pass. The apparatus of this invention is characterized by the presence of a novel framework for supporting the saws, which defines the paths over which the saws of the apparatus move, with such paths being unaffected by the production of sawdust during the cutting operation.

More particularly, an object of the invention is to provide portable saw apparatus including a novel frame or truss which may be supported on rails anchored adjacent the ends of a log, such frame providing support for a movable carriage having power operated saws thereon. The frame comprises a rigid element that guides the carriage along a straight path, with said path disposed to one side of the log being cut.

Another object is to provide novel means for supporting the frame or truss whereby the frame may be shifted in steps transversely of the log as boards are cut from the log.

Another object is to provide improved means for controlling the stepwise advancement of the supporting truss or frame, as successive cuts are made.

Another object is to provide a novel structure of swingable abutment arms which position the frame for sawing selected thicknesses of boards.

Another object is to provide an arrangement of saws therein, one saw being disposed in a vertical plane and one or more saws being disposed in a horizontal plane in intersecting relation with the vertically disposed saw, and also including novel means for varying the spaced relation of the horizontally disposed saws.

Still another object is to provide saw apparatus including a movable carriage, with novel means for shifting the carriage back and forth on a supporting frame.

Additional objects and advantages will become apparent from the following description taken in connection with the accompanying drawings which illustrate a preferred form of the device.

In the drawings:

FIGURE 1 is a foreshortened top plan view of saw apparatus embodying principles of the present invention;

FIGURE 2 is an end elevational view of the present saw apparatus and showing one form of means for mounting the saw on a log;

FIGURE 3 is a view similar to FIGURE 2 but showing another form of means for mounting the saw on a log;

FIGURE 4 is a fragmentary top plan view of the saw apparatus enlarged with relation to FIGURE 1

FIGURE 5 is a sectional view taken on the line 5—5 of FIGURE 1 and enlarged with relation to the latter figure;

FIGURE 6 is a fragmentary sectional view taken on the line 6—6 of FIGURE 4;

FIGURE 7 is an end elevational view taken on the line 7—7 of FIGURE 5;

FIGURE 8 is a fragmentary sectional view taken on the line 8—8 of FIGURE 7;

FIGURE 10 is an enlarged, fragmentary sectional view taken on the line 10—10 of FIGURE 9;

FIGURE 12 is an enlarged, fragmentary, vertical sectional view taken on the line 12—12 of FIGURE 4;

FIGURE 13 is a foreshortened fragmentary sectional view taken on the line 13—13 of FIGURE 4;

FIGURE 14 is a view similar to FIGURES 2 and 3 but showing still another form of means for mounting the saw apparatus on a log;

FIGURE 15 is an end elevational view taken on the line 15—15 of FIGURE 14;

FIGURE 16 is an enlarged fragmentary elevational view of belt retaining means used in the present apparatus, taken on the line 16—16 of FIGURE 4;

FIGURE 17 is a fragmentary cross sectional view of the saw frame showing an alternative form of travel limit means;

FIGURE 18 is a fragmentary plan view taken on the line 18—18 of FIGURE 17; and

FIGURE 19 is an end view of adjustment and operating means for the form of travel limit means shown in FIGURES 17 and 18.

Figure 9:
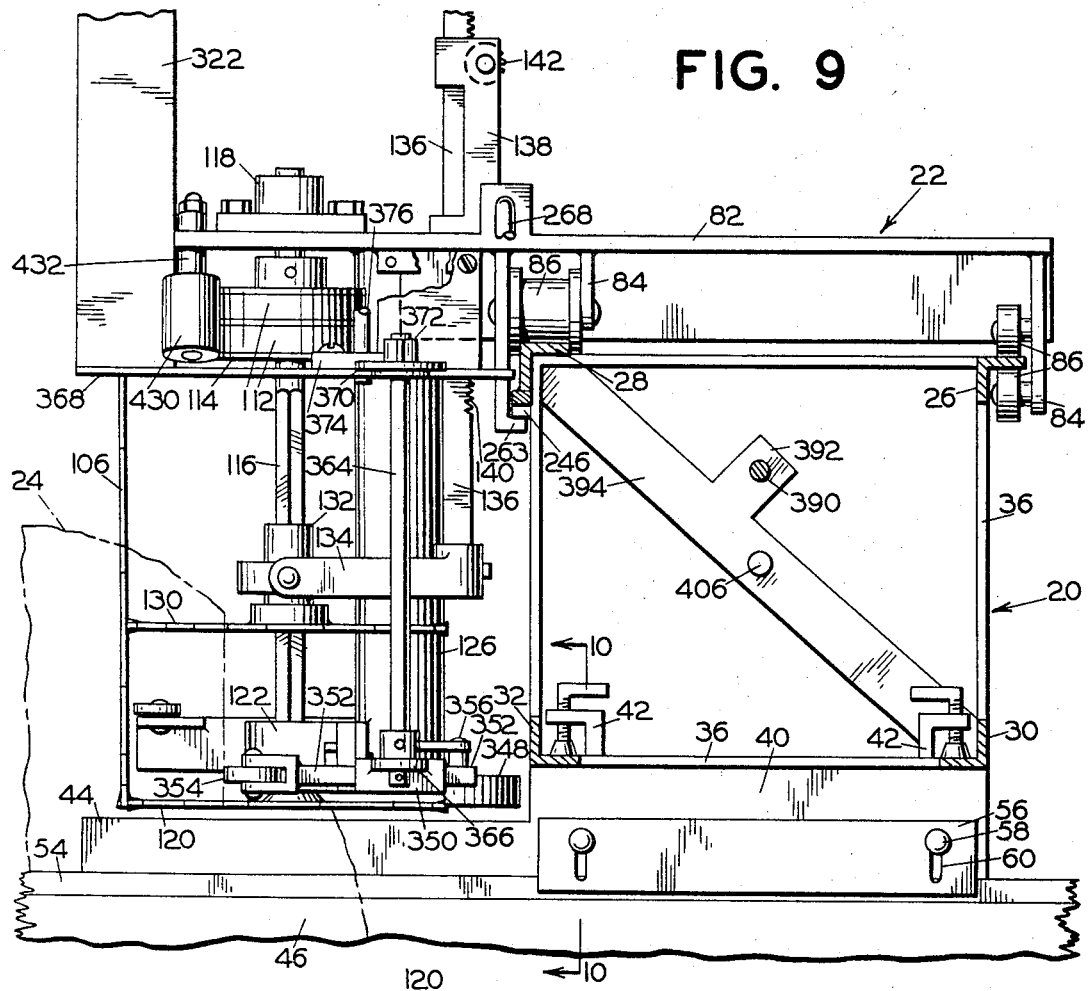
FIGURE 9 is a cross sectional view taken on the line 9—9 of FIGURE 4.

Referring now in particular to the drawings, the portable dimensional cutting saw apparatus of the present invention comprises generally an elongated frame or truss 20 and a carriage 22 mounted on the frame and movable back and forth along the length thereof. The frame 20 is adapted to be mounted on a log 24 along one side thereof and in parallel relation thereto by means to be described hereinafter.

In the form of the invention illustrated, the frame 20 comprises an elongated skeletal structure having longitudinally extending corner bars 26, 28, 30 and 32, FIGURES 1, 4, 5, 7 and 9. The corner bars are interconnected and braced by angled brace members 34 and upright and cross brace members 36.

The frame 20 is arranged to be mounted on a log and moved transversely toward and away from the log by structure now to be described. More particularly, a foot member 40 is releasably clamped on the frame 20 adjacent each end of the log, FIGURES 1, 4 and 9, by any suitable clamp means such as C-clamps 42, FIGURES 9 and 10. The releasable connection of the foot members 40 permits said foot members to be adjusted suitably in spaced relation whereby to be located at the two ends of the log. As will be more apparent hereinafter, saw apparatus of the present invention projects below the bottom of frame 20, and since the foot members project substantially the full width of the saw apparatus they have top cut-out portions 44 to accommodate the downward projecting portion of such saw apparatus.

According to the present invention novel means are provided for supporting the frame 20 in association with the foot members 40 on the log. One such form is shown in FIGURE 2, and also in FIGURES 1, 4, 7 and 9, wherein a rail or timber 46 is secured to each end of the log by one or more lag screws or spikes 48. The rails 46 are elongated with relation to the diameter of the log for supporting the frame 20 at one side of the log, and the outer ends of such rails are supported by legs 50 releasably secured thereto as by means of C-clamps 52. By means of the mounting structure just described, the frame 20 is mounted at any selected height on the log by suitable vertical placement of the rails 46. With particular reference to FIGURES 9 and 10, rails 46 have a groove 54, along the inwardly disposed side of the top edge, and the foot members 40 have forward and rearward plates 56 which are adapted to project beyond the lower edge of the foot members 40 whereby one plate 56 is engaged in groove 54 and the other plate 56 engages the side surface of the rails 46. Plates 56 have a vertically adjustable mounting on the foot members 40 by means of cross pins 58 engaged in vertically disposed slots 60 in the plates. Thus, the plates 56 are adapted to hold the frame member 20 against movement longitudinally of the log but permit laterally slidable movement of such frame toward and away from the log, and the foot members 40 may be disengaged from the rails 46 by vertical movement of the plates 56.

FIGURE 3 illustrates another supporting arrangement for the frame 20 and utilizes a pair of supporting legs 50a at each end of the log. Slidably mounted on each pair of legs is a transverse plate 46a. Journaled in the plate 46a longitudinally thereof is a shaft 62 on which is secured end pinion gears 64 in mesh with vertical rack gear teeth 66 on the legs 50a. One end of the shaft 62 supports a worm gear 68 in mesh with a drive worm gear 70 secured on a shaft 72 arranged for rotative operation by a crank 74. Thus, by operation of the crank 74 the frame supporting timber 46a is adapted to be raised or lowered relative to the log. For leveling purposes, one of the legs 50a has a vertically adjustable threaded foot member 75 at its bottom end.

FIGURES 14 and 15 show still another form of frame supporting structure. In this latter structure, a plurality of the rails 46 are stacked one upon the other in edge relation and secured to the log by one or more lag screws or spikes 48. The lowermost rail 46 is supported on suitable base blocks 76, the log 24 also preferably being placed on blocks 78. Rails 46 are engageable by the foot members 40 in the same manner shown in FIGURE 10, and when it is desired to lower the carriage, the uppermost timber 46 is merely removed so that the carriage will seat on the next lower rail. As apparent in FIGURES 14 and 15, the rails 46 may have different vertical dimensions to lower the saw after a complete layer has been sawed from the log for cutting selected vertical board dimensions.

Carriage 22 has a horizontal platform 82, FIGURES 4, 5 and 9, with wheeled support on the frame 20. To accomplish such wheeled support, the carriage has depending ears 84 on which wheels 86 are rotatably mounted. As best apparent in FIGURES 7 and 9 the wheels 86 ride on the upper surface of corner bars 26 and 28 for rolling support, and furthermore the wheels 86 on the inner or log side of the carriage are flanged to provide longitudinal guiding movement along the corner bar 28 and the wheels 86 on the outer side of the carriage are provided in pairs and have top and bottom engagement with the corner bar 26 to prevent lateral tilting of the carriage.

Platform 82 of the carriage supports a motor 90 attached to the platform by suitable means such as by cleats 92, FIGURE 4. Precise setting of the motor may be accomplished by a handled turn screw 93 threadedly mounted in a front upright wall 82a of the carriage platform and engageable with the motor. Motor 90 has an output shaft 94, FIGURES 4, 5 and 7, to which is secured a double pulley 96 engaged by belts 98 also having a drive connection with a double pulley 100 secured on a cross shaft 102. Shaft 102 is journaled in bearing members 104 secured to the carriage platform 82 in depending relation. Shaft 102 projects beyond the inner or log side of the carriage and comprises a saw shaft or arbor for a circular saw 106 disposed in a vertical plane.

Also secured on the cross shaft 102 is a double pulley 110, shown in phantom lines in FIGURE 5, which drive belts 112 engage with a double pulley 114 secured on a vertical saw shaft or arbor 116. Pulleys 110 and 114 have axes disposed at right angles to each other, and thus belts 112 have a 90° twist between the pulleys. Saw shaft 116 extends upwardly through the carriage platform 82 and has journaled support at this upper end in a bearing 118, FIGURE 9. The bottom end of shaft 116 carries a horizontally disposed circular saw 120 and has journaled support in a lower bearing 122 secured to a vertically disposed plate 124, FIGURE 5, in turn secured on a post 126 having an integral depending connection with the carriage platform 82. Also mounted on the vertical saw shaft 116 for rotation therewith is a second horizontally disposed saw blade 130. Similar to the bottom blade 120, the blade 130 rotates with the shaft 116 but in addition is vertically adjustable on said shaft for varying a thickness dimension of a board being cut. More specifically, saw blade 130 includes a hub 132 having a rotatable connection with a yoke 134 from which extends an upwardly directed operating rod 136. Rod 136 projects upwardly through the carriage platform 82 and has slidable engagement in a channel shaped guide 138 secured on the top of platform 82. Rod 136 has rack teeth 140 engaged by a pinion gear 142 secured on a longitudinally extending shaft 144 having one end journaled in the guide 138. Shaft 144 extends forwardly and has journaled support at its forward end in an upright pointer 146, FIGURES 5 and 7, integral with the platform wall 82a. Secured on the shaft on the rear side of the pointer 146 is a dial wheel 148 having graduations 150 which indicate the position of the adjustable horizontal saw 130 relative to the lower horizontal saw 120. Thus, by rotation of shaft 144 saw blade 130 is adjusted vertically and its spacing from the bottom saw blade 120 is indicated on the dial wheel 148.

Means are provided for locking the shaft 144 against rotation, and for this purpose a hand screw 152 threadedly extends through front wall 82a of the carriage and carries a clamp plate 154 arranged to engage the backside of the dial wheel. Upon suitable operation of the hand screw 152 the clamp plate 154 is adapted to lock the dial wheel 148 against the pointer 146 to hold such dial wheel and shaft 144 in a non-rotative position. Shaft 144 terminates at its forward end in an angled portion 145 facilitating manual rotation of said shaft.

In accordance with the structure thus far described power is transmitted from motor 90 to the horizontal saw shaft 102 as well as the vertical saw shaft 116, and all three saw blades operate continuously as long as the motor is operating. When cutting lumber from a log, bottom saw 120 produces a cut or kerf defining the bottom edge of a board, and vertical saw 106 produces a cut or kerf defining one of the sides of this board. Saw 130 divides the strip of wood cut by saw 130 and saw 106, with the plane of division along this strip being located where the plane of saw 130 is located.

Saws 120 and 130 are equisized, and somewhat smaller than saw 106. These saws occupy substantially horizontal planes, i.e., planes that intersect at right angles the vertical plane of saw 106. As will best be noted by referring to FIGURE 9, the plane of the bottom saw 120 passes through the bottom edge of saw 106, i.e., saw 120 lies in a plane extending tangentially of saw 106. Furthermore, the left edges of saws 120 and 130 lie in the plane of upright saw 106, i.e., saw 106 lies in a plane extending tangentially of saws 120 and 130. With the carriage moved longitudinally along frame 20 the horizontal saws together with the vertical saw are operable to cut elongated strips from a log having predetermined dimensions, as will be hereinafter described.

Saw shaft 116 is located substantially forwardly of horizontal shaft 102 supporting the vertical saw, FIGURE 5. By so spacing the arbors, clearance is assured between the peripheral edges of the various saw. In the case of the vertically adjustable saw 130, the spacing between the saw shafts is sufficient to provide clearance between this saw and the horizontal saw in all positions of the saw 130.

According to the invention, carriage 22 is movable under power along the frame 20 from the starting position shown in FIGURES 4, 5 and 7, to produce a cutting pass for the saws with the saws then cutting into the log and operating to cut lumber. The carriage is returned under power to its starting position prior to the saws undergoing another cutting pass. The returning movement of the carriage is utilized to displace just cut boards from the log by ejecting them axially from the log. The carriage, and the means in which it is moved to and fro, will now be described.

Referring particularly to FIGURES 4 and 5, a cross shaft 158 has journaled support on two or more upright posts or standards 160 secured on the carriage platform 82. Pivotally supported on the shaft 158 is a forward-reverse operating lever 162 the shape of which is particularly apparent in FIGURE 6. Operating lever 162 supports a transverse stub shaft 164 on which is journaled a double pulley 166 arranged in an upper pivoted position of the arm 162 to engage belts 98 which operatively connect the motor output shaft 94 with the horizontal saw shaft 102. Operating lever 162 has an upwardly extending end portion 162a to which is adjustably connected an arm extension 162b, the parts 162a and 162b having adjustable connection by means of clamp bolts 168 or the like receivable through slotted portions 170 in the arm portion 162b.

Secured transversely to the upper end of arm portion 162b is a transverse stub shaft 174 on one end of which is secured a pulley 176. A friction wheel 178 is mounted on the other end of shaft 174 and is disposed closely adjacent and in parallel axial disposition with the double pulley 96, whereby as will be seen more fully hereinafter, such friction wheel is adapted to be brought into rolling drive engagement with the belts 98 operating over the pulley 96 by selected pivotal movement of the lever 162. Also, as will be seen hereinafter, a rolling drive engagement of the friction wheel 178 on the belts 98 produces a reverse drive of the carriage.

Pulley 176 is engaged by a belt 180 which in turn is engaged with an enlarged pulley 182 journaled on the shaft 158 and a smaller size pulley 184 journaled on the shaft 164. Pulley 182 is integral with a smaller pulley 188 for rotation therewith, and this latter pulley is engaged by a belt 190 in turn engaging two other pulleys 192 and 194.

Pulley 192 comprises a variable drive or expandible pulley of well known construction wherein when the belt 190 is tightened the flanges of the pulley spread to speed up the belt, and when the belt is loosened the flanges of the pulley 192 retract to slow down the belt. Pulley 192 is journaled on a transverse short shaft 198 the inner end of which is supported on an upright post or standard 200 secured to the carriage platform 82. The other end of shaft 198 is supported in an upright adjustable plate 202 having a bottom right angle flange 204, also seen in FIGURE 8, seated on the carriage platform 82. The flange 204 has a rearwardly opening slot 206 for receiving clamp studs 208. An adjusting bolt 210 is connected to the plate 202 and extends through the front carriage platform wall 82a. Such bolt receives a nut 212 which upon rotation thereof on the bolt 210, together with a loosened position of clamp stud 208, can adjust longitudinally the position of shaft supporting plate 202 of the carriage for a purpose to be described.

Pulley 194 is journaled on the upper end of an arm 214 having a pivotal attachment 216 at its lower end to the carriage platform. Pulley 194 has journaled support on the arm 214 by means of a short shaft 218, and pivotally connected on this shaft is a handle 220 which extends forwardly through an upright extension 82b at one side of the carriage platform front wall 82a. Handle 220 extends through an aperture 222 in such extension and has a plurality of bottom edge notches 224 adapted for anchoring it in selected longitudinal positions. It is apparent that by the selective positioning of handle 220 the tightness of belt 190 is controlled which in turn controls the output speed of the variable drive pulley 192.

Integrated with variable drive pulley 192 is a pulley 228 engaged by a belt 230 in turn engaging a pulley 232 secured on shaft 158. Thus, shaft 158 receives its drive from pulley 228 integrated with the variable drive pulley 192, and the speed of shaft 158 is controlled by the output of the said pulley 192. Adjusting bolt 210 serves to suitably adjust the drive tension of belt 230 and the tension is selectively adjusted such that the belt will slip if the carriage hits something to avoid damage to the parts.

Shaft 158 at its opposite end from pulley 232 supports a sprocket wheel 234 which is engaged by a sprocket chain 236 in turn engageable with a lower sprocket wheel 238 keyed to a shaft 240 having journaled support in one or more posts or standards 242 depending from the carriage platform 82. Secured on the shaft 240 is a pinion gear 244, and this pinion gear is in mesh with depending rack teeth 246 provided on the corner bar 28 of the elongated frame 20. Rack teeth 246 extend along the frame 28 a sufficient length to provide driving of the carriage substantially from one end of the frame to the other in order that the saw blades can establish a full length cut in a log.

It is desirable that clutching mechanism be associated with the sprocket wheel 234 in order that driving movement of the carriage can be interrupted at any time. As an example of the clutching mechanism, the sprocket wheel 234 may be freely journaled on the shaft 158 and carry one or more dogs 248 arranged for releasable engagement with a notched clutch member 250 keyed to the shaft 158 but having slidable movement toward and away from the sprocket wheel. Clutch member 250 is urged toward the sprocket wheel 234 by a compression spring 252 on the shaft and confined between the said clutch member and an end suppporting post 260. Manual control of the clutch member 250 is accomplished by a shaft 254 journaled at one end in the front wall 82a of the carriage platform and at its other end in an upright post or standard 256. Shaft 254 has a pair of upright fingers 258 which engage on opposite sides of a groove 260 in the clutch member 250. This shaft terminates at the forward end thereof in a crank handle 262, and it is seen that by suitable rotation of the shaft 254 clutch member 250 is disengageable from the sprocket for interrupting the drive to the carriage.

Depending from the wheel supporting ear 84 at the forward wheel 86, FIGURES 5 and 9, is a flanged arm 263 which projects under the rack teeth 246 and serves to positively hold the pinion gear 244 in mesh with such rack teeth.

As explained hereinbefore, operating lever 162 is operative to cause either forward or reverse movement of of the carriage. As will now be described this lever is also operative to provide a neutral or non-drive condition for the carriage. That is, in an upper position of the lever 162 the pulleys 166 are in engagement with the belts 98 to provide a clockwise rotation of all the pulleys in the system, as indicated by arrows 264 in FIGURE 5. When the lever 162 is lowered by pivotal movement on the shaft 158, the pulleys 166 disengage from the belts 98 and friction wheel 178 moves into surface engagement with belts 98 operating over pulleys 96. Friction wheel 178 is then rotated in a counterclockwise direction, FIGURE 5, and the pulley 176 as well as pulleys 182, 188, 192, 228, and 232 also rotate counterclockwise and cause counterclockwise rotation of shaft 158 to drive the carriage in reverse. Operating lever 162 also has a position intermediate its upper and lower positions to provide a neutral condition wherein pulleys 166 are out of engagement with belts 98 and friction wheel 178 is out of rolling engagement with belts 98. Such drive position will now be described.

Lever 162 projects forwardly beyond the front wall 82a of the carriage and is arranged to be releasably locked on a post 266 integrated with and extending above the front wall 82a. The releasable connection of the lever 162 with the post 266 is accomplished by a side edge notch 268 in the post. The positioned engagement of the lever in this notch is such that when the lever is manually raised and positioned in the notch, pulleys 166 are brought into engagement with the belts 198 for forward drive movement of the carriage. Post 266 is adjustable vertically for the predetermined vertical positioning of notch 268, and for this purpose is secured to the front wall 82a by means of one or more bolts 270 passing through a vertical slot 272 in the post.

FIGURE 12 shows in dotted lines the lower position of the lever 162 comprising a position resting on the top edge of wall 82a. This lower position comprises a reverse position wherein the pulleys 166 are out of engagement with the belts 198 and the friction wheel 178 engages belts 198. To initiate forward drive of the carriage, the operator raises the lever 162 and places it in notch 268.

Means are provided for reversing the direction of the carriage when the latter has completed a sawing run to the far end of the log, and for this purpose there is provided a reversing plate 276, FIGURE 4, clamped in a selected position on the corner bar 28 and having an angled edge 278. Reversing plate 276 is secured releasably to the corner bar 28 by suitable clamp means 280.

The angled edge 278 of the clamp plate 276 is in the path of a reversing bar 282 having journaled engagement at one end of the carriage in an upright standard 284 and at its other end in the front wall 82a. Reversing bar 282 has a right angle end extension 286 which normally depends downwardly as best seen in FIGURE 5 and which when moved into engagement with the angled edge 278 of reversing plate 276 is rotated in a clockwise direction as viewed in FIGURE 12.

Secured on the shaft 282 adjacent its forward end and behind the forward wall 82a is a lever arm 290 which normally extends substantially horizontally and which has a pivotal connection with an upright bar 292. The bar 292 is disposed substantially directly behind the post 266 and has an upper angled end edge 294 arranged in an upward movement of the bar 292 to displace the lever 162 laterally from the notch 268. The bar 292 has vertically guided movement by means of a guide pin 296 integrated with the post 266 and slidably engaged in a slot 298 in the bar 292.

Thus, when the operator initiates forward movement of the carriage by placing the lever 162 in the notch 268, the carriage will have forward movement until such time that the right angle end portion 286 of reversing bar 282 engages the angled edge 278 of the reversing plate 276. When such engagement occurs, the reversing bar 282 is rotated which causes the bar 292 to raise and displace the lever 162 from the slot 268. The lever 162 then falls by gravity to its lower position shown in phantom lines in FIGURE 12 whereupon as described hereinbefore the carriage will then be driven in a reverse or retracting direction. Since the reverse drive of the carriage is accomplished by the friction wheel 178 and since this wheel is smaller than the pulley 96, the retracting travel of the carriage is much faster than its forward or advancing travel.

The neutral position of operating lever 162 is desirable after return of the carriage to its initial starting position to enable the operator to re-position the frame 20 for another cut. To accomplish this neutral position the frame 20 has a cam track 300, FIGURES 5 and 7, at the forward end thereof and this cam track is engageable by a roller 302 journaled on the bottom end of an upright arm 304 slidably mounted in a bracket 306 secured in depending relation to the carriage 22. As best apparent in FIGURE 7, arm 304 extends upwardly on the forward side of carriage front wall 82a and has pivotal connection with one end of a rocker arm 308 which extends angularly downwardly in the direction of vertical saw blade 106 and which has pivotal connection intermediate its ends with the carriage by means of a pivot pin 310 projecting from a mounting plate 312 secured to the carriage. Projecting integrally from the upper end of the lever arm 308 is an abutment finger or extension 314 having a flat upper abutment surface 316. Surface 316 is adapted for engagement by an adjustable screw 318 threadedly mounted in a bracket arm 320 secured in projecting relation to the lever arm 162.

The parts for accomplishing neutral drive for the carriage are arranged such that when the carriage returns to its initial starting position, as shown in FIGURES 5 and 7, the roller 302 operating on the cam track 300 will raise the lever 162 to its intermediate or neutral position. As stated hereinbefore, in this neutral position the pulleys 166 are out of engagement with the belts 98 and the friction wheel 178 also has not moved into engagement with belts 98. Although the carriage drive is shifted to neutral when the carriage reaches its initial starting position, it is desirable that a stop be provided for the carriage at such position. For this purpose, a stop block 321, FIGURE 7, is secured on one or both of the carriage supporting bars or tracks 26 and 28 for abutment by the front wheels 86 of the carriage.

As best viewed in FIGURES 4 and 7, a stationary saw guard portion 322 is secured on the carriage, such securement being accomplished by any suitable means such as by welding it to the carriage extension 82b and to end edges of the carriage platform. A movable saw guard portion 324 is disposed at the lower rearward portion of the saw blade 106 and has a rotatable telescoping fit on the stationary saw guard portion 322. The movable saw guard portion 324 is rotatably mounted on the saw shaft 102 by means of a bearing bracket 326, FIGURE 8, and is normally held in an upper out-of-the-way position by a tension spring 328 connected between the movable saw guard and carriage platform extension 82b. It is desired, however, that the movable saw guard portion be brought down into a lower protective position when the carriage returns to its starting position, and for this purpose the lever arm 308 extends to a point adjacent the guard portion 324 and has a projecting pin 330, FIGURES 4, 5, and 7, which is adapted for engagement with a projecting pin 332, on the movable saw guard portion. More particularly, the parts are arranged such that when the lever arm 308 is pivoted in a clockwise direction, FIGURE 7, by means of the upward movement of the arm 304, engagement of pin 330 with pin 332 rotates the movable saw guard portion to its lowered position. As the carriage moves forwardly in the initiation of a saw cut, the arm 304 lowers and the lever arm 308 consequently rotates in a counterclockwise direction whereby its lower end raises and the spring 326 pulls the movable saw guard portion upwardly to an out-of-the-way position for sawing.

The present saw apparatus employs travel limit means for rapidly setting the frame 20 to established board thickness cuts. Such means are shown in FIGURES 1, 4 and 13 and comprise a pair of arms 334, such arms being disposed in spaced relation so as to be adjacent the ends of the log. These arms are of identical construction and have hollow open ended body portions for the reception of a feeler stud 336 in each end thereof. Studs 336 are adapted to be fixedly secured in the arms 334 at selected projecting distances by means of set screws 338. Arms 334 are pivotally attached to one of the corner bars of the frame 20 such as the corner bar 32 by means of pivot pins 340, FIGURE 13, and are held precisely in right angle relationship to the travel of the carriage by a tension spring 342 one end of which is connected to corner bar 26 and the other end of which is releasably connected to a double ended connector bar 344. That is, the spring may be attached to one end of the connector bar 344 to hold one end of the arm 334 toward the log or such spring may be disconnected from the said one end of the connector bar 344 and connected to the opposite end to hold the other end of the bar toward the log. Thus, by selectively setting the feeler studs 336 in different projecting distances from the ends of the arms 334 with such projecting distances comprising the different board thicknesses to be sawed, the only set-up required to change from one board thickness to another is to disconnect the springs 342 from the one end of their respective connector bars and connect them to the other end of the latter.

Figure 11:
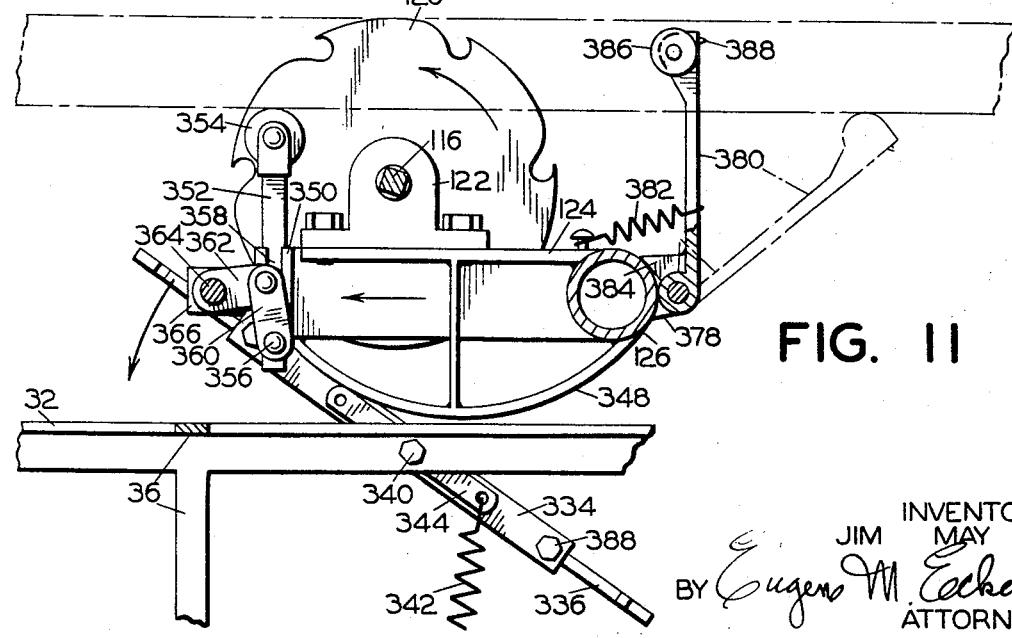
FIGURE 11 is a fragmentary, horizontal sectional view taken on the line 11—11 of FIGURE 5.

With reference now to FIGURES 5 and 11, the travel limit arms 334 are swung out of the way of the saws and carriage during a cutting pass by a curved plate 348 secured to the post 126 and to the bearing mounting plate 124. Plate 348 engages and swings the arms 334 out of the way in both directions of movement of the carriage.

It is desired that the carriage have guided movement along a saw kerf previously produced in order to take the side load of the saw and to dampen vibrations, and for this purpose a laterally extending tubular socket 350, FIGURES 5, 9 and 11, is secured to the bearing mounting plate 124 and slidably receives an arm 352 supporting a roller 354 on the end thereof, the roller 354 being adapted to engage a vertical kerf produced by a previous cut.

It is necessary that the roller 354 be adjusted transversely with relation to the vertical saw, and for this purpose an upright pin 356 on the arm 352 extends through a slot 358 in the upper wall of the socket, and this pin is pivotally connected to a link 360 in turn pivotally connected to a link 362. Link 362 is secured on an upstanding shaft 364 journaled at its lower end in a bracket arm 366 integrated with the socket member 350 and at its upper end in an auxiliary angular wall 368 secured to the carriage platform 82. The upper end of shaft 364 has a graduated dial wheel 370 secured thereto, FIGURES 4, 5, and 9, and this wheel has a turning knob 372 for operation thereof. By rotation of the dial wheel 370, the linkage 360, 362 serves to axially move the roller supporting arm 352 relative to the supporting socket whereby selective carriage guiding may be accomplished by the roller 354.

It is desired that the dial wheel 370 be locked in set positions, and for this purpose a clamp plate 374, FIGURES 4 and 5, has overlapping engagement with the dial wheel and is adapted for releasable clamping engagement therewith through the medium of an upstanding turn screw 376 threadedly engaged in the auxiliary wall 368.

Referring now to FIGURES 7 and 11, pivotally supported by pivot means 378 on post 126 depending from carriage platform 82 is an ejector plate 380. A spring 382 is connected between the ejector plate and the post 126 and is operable to urge the plate to the position shown in full lines in FIGURE 11. Ejector plate 380 abuts against a stop 384 to limit counterclockwise rotation, FIGURE 11, to a position substantially normal to the direction of travel of the carriage. The plate 380, however, is adapted to pivot in a clockwise direction against the action of the spring 382 to the phantom line position shown in FIGURE 11.

When the carriage moves along the frame in a cutting path of the saws, ejector plate 380 swings to the phantom position indicated in FIGURE 11, thus to accommodate the passage of the boards cut from the log by the saws traveling past the ejector plate. Upon the completion of a cutting pass and plate 380 clearing the ends of just cut boards, the plate swings to its perpendicular position. Upon the carriage then returning to its starting position the plate engages the end of the board just cut from the log and pushes these boards axially from the log. Thus, an operator standing adjacent the end of the log where the carriage is located when at its starting position may take the boards as they are displaced toward him and stack them in suitable piles. In a preferred construction, the ejector plate 380 carries a roller 386 at its outer end in order to have free rolling engagement with a board being cut, and also the forward side of the plate 380 at the outer end thereof has prongs 388 which establish a positive bite on the piece of lumber.

After the saws have been moved along the length of the log by the carriage in a cutting pass, and upon return of the carriage to its starting position, frame 20 is then advanced laterally on the supporting rails 46 a distance corresponding to the width of the boards that is desired next to be cut from the log. The frame is thus advanced a step after each cut, and the means for advancing the frame over the rails 46 will now be described.

Referring now to FIGURES 1, 4, 7 and 9, a shaft 390 extends longitudinally of the frame 20 and is journaled in lugs 392 on diagonal frame members 394. This shaft, as shown in FIGURE 1, extends substantially the full length of the frame 20, and has a drum 396 on the rearward end thereof. Shaft 390 at the forward end thereof has a right angle finger 398, and journaled on the shaft on the back side of finger 398 is a hub 400 to which is integrated a pinion gear 402 in mesh with a lower enlarged gear 404. Pinion gear 402 is disposed on the back side of supporting lug 392, and the enlarged gear 404 is secured on a shaft 406 journaled in diagonal frame members 394. Shaft 406 extends only a short distance from the forward end of the frame and has a drum 408 secured on its rearwardmost end.

Projecting at right angles from the hub 400 is an arm 410 from which projects a horizontal shaft 412 slidably receiving a handle member 414. Handle member 414 is urged outwardly from the arm 410 by means of a compression spring 416 on the shaft, and has an upwardly directed projection 418 of a length to engage finger 398 when the handle member 414 is pushed inwardly toward the arm 410. That is, in the normal spring pressed position of the handle member 414, there is no connection between such handle member and the finger 498, but when said handle member is pressed inwardly it is adapted to engage and rotate the finger 398, and consequently the shaft 390, therewith. In a preferred construction, the shaft 412 is of non-round configuration whereby the handle member 414 will be disposed with its projection 418 extending upwardly. By means of the structure described, the arm 410 is adapted, when its handle member 414 is in its outer spring pressed position, to be rotated relative to the shaft 390 whereby to rotate singly the drum 408. However, when it is desired to rotate both the shafts 390 and 406 at once, the handle member 414 is pushed inwardly so that the projetcion 418 will be in the path of finger 398.

With reference to FIGURES 1, 2 and 7, a cable 420 leads from each of the drums 396 and 408 and terminates at its free end in a hook member 422. These cables are reeved over one or the other of a pair of sheaves 424 rotatably mounted on bracket plates 426 suitably secured to frame 20 in substantial vertical alignment below the respective drums. When it is desired to move the frame 20 transversely toward the log the cables are connected to the rails 46 at the log end thereof and the shafts 390 and 406 operated. When it is desired to move the carriage away from the log, the hook ends of the cables are disengaged from the log ends of the rails 46, and brought out in the opposite direction to engage the other sheaves 424 in the pairs and then connected to the opposite ends of the rails. Suitable rotation of the shafts 390 and 406 will thus move the frame 20 away from the log.

The carriage moving structure just described provides for easy manipulation of the frame toward and away from the log, particularly since the heavy end of the frame, comprising the motor end, is movable by a gear reduction drive of drum 408 through the medium of pinion gear 402 and the enlarged gear 404. The direct drive of drum 396 on the shaft 390 readily provides movement for the other end of the frame since such is the light end of the frame and moves easily. Also, since the far end of the frame is movable by a direct drive of shaft 390 and the near or motor end of the frame is movable by a gear reduction drive, the latter moves much slower than the far end and the occasion will not arise where the far end needs additional movement. That is, by common rotation of the shafts 390 and 406, the far end of the frame will be rapidly moved to its desired position and after it has reached such position the handle member 414 can be moved outwardly to provide the necessary movement of the motor end of the frame.

As stated, the belts 112 are twisted 90° in their run between pulleys 114 and pulleys 110 and in addition are angled downwardly somewhat since the pulleys 110 are on a slightly lower plane. To prevent the belts 112 from disengaging themselves from pulleys 114 holding means are provided in the form of a roller 430. This roller is journalled on a shaft 432, FIGURES 4, 9 and 16, secured to the platform 82. The roller is held by the shaft in surface engagement with the belts 112 at a side location of the pulleys 114 and furthermore is angled such that its axis is substantially normal to the run of the belts between the sets of pulleys 110 and 114, such disposition having been found to provide the most positive holding position for maintaining the belts on the pulleys 114.

FIGURES 17, 18 and 19 illustrate a modified form of the travel limit means shown in FIGURES 4 and 13. This modification comprises a laterally directed arm 334a having a vertical hub 434 at its inner end for receiving a pivot pin 436. Pivot pin 436 has a slidable connection in a slot 438 provided in a cross brace member 36 of the frame 20. The arm 334a projects laterally beyond the one side of the frame 20, and since it is supported on the pivot pin 436 it is adapted to be pivoted in order that the saws can move thereby. For this latter purpose, hub 434 carries a laterally projecting abutment pin 440 which is in the path of the curved plate 348, FIGURE 11, whereby the arm 334a is pivoted to an out of the way position when the saw moves through that area.

The arm 334a is normally held in its outwardly directed position by a tension spring 442 connected at one of its ends to an ear 444 on the hub 434 and at its other end to an anchor pin 446 secured to the brace member 36. Thus, it is apparent that the spring 442 urges the arm 334a in an outwardly projecting direction. Also mounted on the pivot pin 436 and disposed on the underside of the frame member 36 is a plate member 448 the free end of which carries an upstanding lug 450 projecting through the slot 438. Connected to the lug 450 is one end of a chain 452 which extends partially around a sprocket wheel 454 and is anchored to the sprocket wheel by suitable anchor means 456.

It is to be understood that an arm assembly as just described is mounted on the frame 20 adjacent each end of the latter or at least in a selected spaced relation such that the arms are capable of engaging the log adjacent the ends of the log. It is desirable that the two arms 334a be adjustable by common means and therefore the two sprocket wheels 454 are keyed or otherwise secured on a common shaft 458 which extends longitudinally of the frame 20 and which is journaled in brackets 460 integrated with the frame. Thus, upon rotation of the shaft 458 in a counterclockwise direction, FIGURE 17, the arms 334a are moved to the right for extension, and upon rotation of the shaft 458 in a clockwise direction the arms are moved to the left for retraction, such retracting movement being accomplished by the springs 442.

It is preferred that adjustable movement of the arms 334a be accomplished by the operator at the forward end of the apparatus, and for this purpose the shaft 458 extends to the forward end of the frame and has journaled support at this forward end in a bracket 460a, FIGURE 19. Secured on the forward end of the shaft 458 is a dial wheel 462 having graduations 464 which by association with a reference mark 466 facilitate a setting of the dial wheel 462 to accomplish selected extended positions of the arms 334a. Dial wheel 462 is adapted to be clamped in a set position by clamp means 468.

In the operation of the present saw apparatus on a log lying on the ground initially rail members 46 or 46a are secured in suitable horizontal positions against the end of the log by means shown in FIGURE 2, 3 and 14. Frame 20 is then placed on the rail members. Vertically adjustable saw 130 may then be adjusted to the desired height where it will cut off imperfect or waste portions of the log. With the motor operating and the carriage occupying its starting position, operating lever 162 is pushed upwardly into its holding notch 268. The carriage then moves forwardly and a cutting operation of the saw commences.

During the movement of the carriage on the frame the saws discussed produce horizontal and vertical kerfs in the log, which join each other to produce an elongated board or boards. Upon the completion of a cutting pass, the ejector plate 380 swings to its position perpendicular to the frame and on return movement of the carriage the just cut boards are displaced by shifting them axially of the log toward the operator. The carriage is reversed in its movement at the far end of the frame by engagement of downturned end 286 of reversing bar 282 with the reversing plate 276, and when the carriage returns to the starting end, the operating lever 162 will be raised to its neutral position by the finger 314 on the lever arm 308.

After the completion of a cutting pass, the frame is moved transversely of the log, along rails 46 a sufficient distance to place the travel limit means 334 discussed in contact with the vertical kerf produced on the previous cutting pass. The travel limit means may be pre-set to saw the desired board thickness and if a different thickness is desired and a proper setting has been accomplished on the other end of such travel limit means, it may merely be turned end for end. It may also be desired before making another cutting pass to adjust the vertical disposition of saw blade 130. The saw is moved in a straight forward cutting pass by engagement of guide roller 354 which of course also is first suitably adjusted to make the desired thickness cut. When a complete horizontal layer has been removed from the log, then the frame is lowered by lowering the rail 46.

The present saw apparatus may be operated by a single operator positioned adjacent the starting position of the carriage whereby he makes appropriate adjustments in the means for advancing the frame after a cutting pass. The apparatus is easily moved about even in rough terrain and may be used in areas where conventional lumber techniques make lumber production impractical.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A portable dimensional cutting saw apparatus comprising
    (a) an elongated frame,
    (b) a saw carriage movable on said frame,
    (c) rail means adapted to be mounted in a stationary position adjacent each end of the log,
    (d) said rail means having means for supporting the frame longitudinally of the log and for movement in a direction extending transversely of the log,
    (e) at least two saws mounted on said carriage and operable to cut a strip from the log upon movement of the carriage over said frame,
    (f) and means on said carriage arranged for engagement with a log for guiding at least one of said saws in its depth of cut into the log.

2. The portable dimensional cutting saw apparatus of claim 1 wherein said means for guiding at least one of said saws in its depth of cut into the log comprises
    (a) a guide arm on said carriage directed toward the log,
    (b) a roller on said arm arranged for rolling engagement with the log for guiding at least one of said saws in its depth of cut into the log,
    (c) and means mounting said arm on said carriage for longitudinal adjustment toward and away from the log.

3. A portable dimensional cutting saw apparatus comprising
    (a) an enlongated frame,
    (b) means associated with the said frame for supporting it longitudinally of a log,
    (c) a saw carriage movable on said frame in forward and reverse directions,
    (d) a first saw on said carriage occupying a substantially vertical plane,
    (e) a horizontal shaft on said carriage suporting said first saw,
    (f) a second saw on said carriage occupying a substantially horizontal plane,
    (g) a vertical saw shaft on said carriage suporting said second saw,
    (h) a power unit on said carriage having an output shaft,
    (i) first drive belt means between said output shaft and said first and second shafts for driving said horizontal and vertical shafts,
    (j) interengaging drive means on said carriage and said frame,
    (k) and second drive belt means operably connected to said interengaging drive means and releasably connected to said first drive belt means for accomplishing advancing and retracting movements of said carriage.

4. The saw apparatus of claim 3 wherein
    (a) said first drive belt means includes pulleys on said output shaft and on at least one of said first and second shafts,
    (b) and a lever arm pivotally mounted on said carriage and supporting said second drive belt means for releasable movement of the latter between its positions for advancing and retracting the carriage.

5. The saw apparatus of claim 4 including
    (a) support means on said carriage for supporting said lever arm in either of its positions for advancing and retracting the carriage,
    (b) and support means on said carriage arranged for holding said lever arm in a neutral position.

6. The saw apparatus of claim 4 including
    (a) support means on said carriage for supporting said lever arm in either of its positions for advancing or retracting the carriage,
    (b) trip means on said carriage engageable with said lever arm for releasing the latter from its forward drive carriage position,
    (c) and reversing means on said frame engageable by said trip means whereby upon movement of said carriage to a selected advanced position said trip means is operative by said reversing means to cause movement of said lever arm to a position for retracting the carriage.

7. The saw apparatus of claim 4 including
    (a) support means on said carriage for supporting said lever arm in either of its positions for advancing or retracting the carriage,
    (b) trip means on said carriage engageable with said lever arm for releasing the latter from its forward drive carriage position,
    (c) reversing means on said frame engageable by said trip means whereby upon movement of said carriage to a selected advanced position said trip means is operative by said reversing means to cause movement of said lever arm to a position for retracting the carriage,
    (d) and means operative with said lever arm to position the same in a neutral position intermediate its positions for advancing and retracting the carriage when said carriage moves to a fully retracted position.

8. The saw apparatus of claim 3 wherein said interengaging drive means comprises
    (a) rack teeth extending longitudinally on said frame,
    (b) and a pinion gear on said carriage in mesh with said rack teeth.

9. The saw apparatus of claim 3 wherein
    (a) said first belt drive means includes pulleys on said output shaft and on at least one of said first and second shafts,
    (b) a lever arm pivotally mounted on said carriage and supporting said second drive means for releasable movement of the latter between its positions for advancing and retracting the carriage,
    (c) and a friction drive wheel on said lever arranged to engage one of said pulleys in the position of said lever which retracts said carriage.

10. The saw apparatus of claim 9 wherein said friction wheel is of less diameter than the pulley which it engages whereby to drive the carriage at a greater speed in its retracting movement.

11. The saw apparatus of claim 9 including a variable drove pulley operably connected to said second drive belt means and having speed settings for varying the speed of the carriage.

12. The saw apparatus of claim 4 wherein
(a) said first and second shafts are disposed at right angles relative to each other and said first drive belt means includes pulleys on said shafts and interconnecting belts twisted 90°,
(b) and a belt retaining roller mounted in substantially surface engagement with pulleys on which said twisted belts are engaged for retaining said twisted belts on their pulleys.

13. The saw apparatus of claim 4 wherein
(a) said first and second shafts are disposed at right angles relative to each other and said first drive belt means includes pulleys on said shafts and interconnecting belts twisted 90°,
(b) and a belt retaining roller mounted in substantially surface engagement with pulleys on which said twisted belts are engaged for retaining said twisted belts on their pulleys,
(c) the axes of said roller being disposed at right angles to the axes of the belts which it engages.

14. A portable dimensional cutting saw apparatus comprising
(a) an elongated frame,
(b) a saw carriage movable on said frame,
(c) rail means adapted to be mounted in a stationary position adjacent each end of the log,
(d) said rail means having means for supporting the frame longitudinally of the log and for movement in a direction extending transversely of the log,
(e) at least two saws mounted on said carriage and operable to cut a strip from the log upon movement of the carriage over said frame,
(f) cable drive means adjacent each end of said frame for moving said frame relative to a log,
(g) a cable operably connected to each of said cable drive means,
(h) means on said cables adapted for releasable connection to said rail means,
(i) and a pair of shafts for supporting respective ones of said cable drive means,
(j) said shafts having journaled support in said frame longitudinally thereof and having projecting ends in substantially parallel relation,
(k) one of said shafts having a right angle integral extension on its projecting end and said other shaft having a handle on its projecting end,
(l) said handle being movable into and out of engagement with said extension whereby the shaft with said handle is arranged to be rotated independently of said other shaft when said handle is moved out of engagement with said extension and said shaft with said handle is arranged to rotate said other shaft therewith when said handle is moved into engagement with said extension.

15. The saw apparatus of claim 14 including
(a) a pair of cable guide means on said frame adjacent respective ones of said cable drive means,
(b) said cables being arranged for engagement with one or the other of said cable guide means in their respective pairs of said cable guide means,
(c) said cable when connected adjacent one end of said rail means and engageable with one of said cable guide means being operative to shift said frame toward the log upon operation of said cable drive means and when connected adjacent the other end of said rail means and engageable with the other of said rail means being operative to shift said frame away from the log upon operation of said cable drive means.

16. A portable dimensional cutting saw apparatus comprising
(a) an elongated frame,
(b) a saw carriage movable on said frame,
(c) rail means adapted to be mounted in a stationary position adjacent each end of the log,
(d) said rail means having means for supporting the frame longitudinally of the log and for movement in a direction extending transversely of the log,
(e) at least two saws mounted on said carriage and operable to cut a strip from the log upon movement of the carriage over said frame,
(f) travel limit means,
(g) said travel limit means comprising an elongated body member pivotally mounted on said frame,
(h) a feeler stud mounted at each end of said body member,
(i) said feeler studs having independent longitudinal adjustment in projecting relation from the ends of said body member and being arranged to abut against a portion of the log to limit movement of said frame toward the log,
(j) and means for holding said body member transversely of the frame for directing one or the other of said feeler stud ends thereof toward the log.

References Cited

UNITED STATES PATENTS 2,609,848  9/1952  Schneider.
2,800,932  7/1957  Scott.

FOREIGN PATENTS 732,524  6/1955  Great Britain.

WILLIAM W. DYER, Jr., *Primary Examiner.*

W. D. BRAY, *Assistant Examiner.*